United States Patent [19]

Braun et al.

[11] 3,940,462

[45] *Feb. 24, 1976

[54] BUBBLE TRAY AND CAP ASSEMBLY FOR FLUID CONTACT APPARATUS

[75] Inventors: Vlastimil Braun; Oto Vitek, both of Brno, Czechoslovakia

[73] Assignee: Chepos Zavody Chemicho a Potravinarskeho Strojirenstvi, Generalni Reditelstvi, Brno, Czechoslovakia

[ * ] Notice: The portion of the term of this patent subsequent to May 20, 1986, has been disclaimed.

[22] Filed: May 31, 1973

[21] Appl. No.: 365,576

Related U.S. Application Data

[63] Continuation of Ser. No. 856,955, Sept. 11, 1969, abandoned, which is a continuation-in-part of Ser. No. 464,982, June 18, 1965, abandoned.

[30] Foreign Application Priority Data

June 27, 1964 Czechoslovakia .................. 3710-64

[52] U.S. Cl. .......................................... 261/114 VT
[51] Int. Cl.² .......................................... B01D 3/20
[58] Field of Search ............. 261/114, 114 VT, 113; 202/158

[56] References Cited
UNITED STATES PATENTS

| | | | |
|---|---|---|---|
| 2,951,691 | 9/1960 | Nutter | 261/114 |
| 3,125,614 | 3/1964 | Mayfield et al. | 261/114 |
| 3,245,669 | 4/1966 | Huggins et al. | 261/114 |
| 3,333,836 | 8/1967 | Bahout | 261/114 |
| 3,445,095 | 5/1969 | Braun et al. | 261/114 |

FOREIGN PATENTS OR APPLICATIONS

| | | | |
|---|---|---|---|
| 645,354 | 7/1962 | Canada | 261/114 VT |
| 1,237,299 | 6/1960 | France | 261/114 JP |
| 295,786 | 3/1964 | Netherlands | 261/114 VT |

*Primary Examiner*—Frank W. Lutter
*Assistant Examiner*—William Cuchlinski, Jr.

[57] ABSTRACT

A tray member for a fluid contact apparatus has elongated slots. An elongated cap covers either a single slot or two or more aligned slots. Each cap has opposite lengthwise extending side portions above the upper surface of the tray member and is provided with spacedly arranged recesses along the lengthwise extending edges of said side portions. The recesses along one of the two edges are staggered with respect to the recesses along the other edge. Each recess is formed by a downwardly bent part of the respective side portion.

5 Claims, 11 Drawing Figures

BUBBLE TRAY AND CAP ASSEMBLY FOR FLUID CONTACT APPARATUS

CROSS-REFERENCE TO RELATED APPLICATION

This is a continuation of Ser. No. 856,955 filed Sept. 11, 1969 now abandoned which itself is a continuation in part of application Ser. No. 464,982 filed June 18, 1965 now abandoned, the entire disclosure of which is incorporated herein by reference.

BACKGROUND OF THE INVENTION

This invention relates to fluid contact apparatus and more particularly to a bubble tray and cap assembly for use in absorbers, rectifiers and apparatus of this general type. Such apparatus are used, for instance, in the petroleum, petrochemical, and chemical industries for bringing gases and/or vapors and liquid into intimate counter-current contact.

Known tray and cap assemblies are subject to one or more serious objections which greatly limit their usefulness. Such constructions show a lack of uniform and efficient performance, and others are complicated in details and require a large expenditure in time and labor to secure parts to the trays and, in addition, are often also deficient in performance.

Fluid contact apparatus or towers are provided with a series of trays which are usually equally spaced apart. The tower is vertically, and the trays therein are horizontally, arranged. Each tray has a multiplicity of flow passages for providing substantially uniform distribution of an ascending fluid and a descending liquid, and thorough mixing of said fluid with said liquid. Intimate contact and thorough mixing of the ascending fluid and the descending liquid have great importance in operations, such as fractional distillation of fluid mixtures, absorption of gases in liquids, stripping of volatile components from liquids, and similar procedures.

The referred to caps coact with the liquid-supporting trays to control the flow of vapors and/or gases upwardly through the trays, while the liquid flows downwardly, to bring the fluids in contact with each other, and to cause the ascending fluid to be thoroughly mixed with the liquid supported by the trays, thus effecting heat exchange and mass exchange actions between the fluids.

SUMMARY OF THE INVENTION

The primary object of our present invention is to provide a simple, efficient, and economical control means composed of a minimum number of parts and which automatically regulates the upward flow of gas or vapor through openings or flow passages in the trays of a contact apparatus. The control means includes one-piece self-retaining floating valves each of which normally closes a single or several flow passages in a tray.

The invention aims at a uniform type of tray and cap assembly which will permit the parts to be economically produced, easily assembled in a contact apparatus, and easily maintained therein.

Another object of the invention is to provide a cap construction which affords minimum resistance to fluid flow across the tray surfaces and thus obviates the buildup of a hydraulic gradient across the trays.

Important objects of this invention center about a tray and cap assembly which will ensure even distribution of both the vaporous and/or gaseous phase and the liquid phase for effective heat and intimate mass transfer, thus improve the efficiency of the tray, enhance the capacity of a contact apparatus equipped with the tray and cap assembly of the invention, and achieve a wide flexibility of the apparatus within a broad range of practical services. The tray and cap assembly of the invention secures a more uniform efficiency of the assembly and a more intimate contact across the whole tray surface between the countercurrently moving two phases.

A still further object of our invention is to provide a tray and cap assembly that is free of obstructions to the liquid flow and will lessen sedimentation of impurities and the necessity for the provision of frequent cleaning intervals, especially in services in which there is a tendency for solid particles to settle, which may result from destructive effects upon the materials treated.

Additional objects of the invention will be apparent from the following description.

In accordance with the invention, each tray member of a contact apparatus has a plurality of elongated slots and is associated with elongated caps for the slots. Each cap has opposite lengthwise extending side portions above the upper surface of the tray member. Each side portion has a lengthwise extending edge and a row of spacedly arranged recesses along said edge, the recesses along said edge being staggered with respect to the recesses along the edge of the other side portion. The recesses along the edges of both of said side portions being constituted by downwardly bent parts which form longitudinally spaced individual depending members extending through the respective slot.

An application filed by us on Jan. 31, 1969, Ser. No. 795,474, as another continuation-in-part of the same parent application Ser. No. 464,982 deals with elongated caps for slotted trays, each cap being provided with a single row of longitudinally spaced depending members that extend transversely of the elongation of the respective cap and downwardly through the respective slot in the respective tray. The present invention provides two parallel rows, rather than a single row, of longitudinally spaced and longitudinally, rather than transversely extending depending members.

BRIEF DESCRIPTION OF ACCOMPANYING DRAWINGS

Other features and many of the attendant advantages of the invention will readily be appreciated as the same becomes better understood by reference to the following detailed description of preferred embodiments, when considered in connection with the accompanying drawings in which.

DETAILED DESCRIPTION OF PREFERRED EMBODIMENTS

Figure 1:
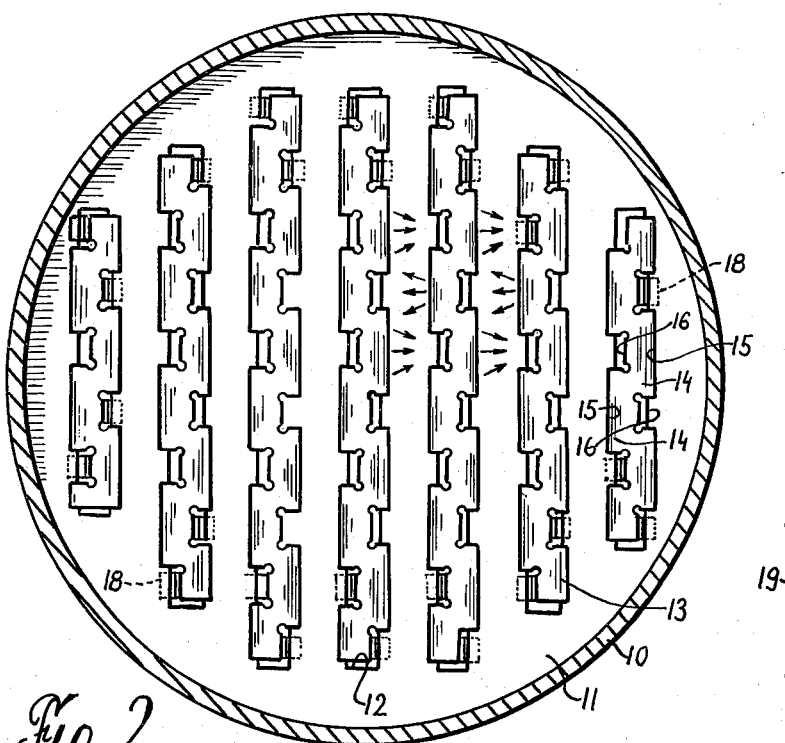
FIG. 1 is a sectional plan view of a gas and liquid contact tower and shows tray and cap assemblies in accordance with the invention.
Figure 2:
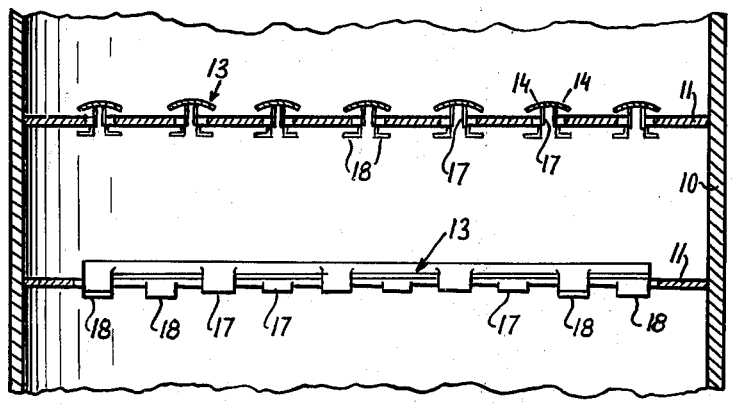
FIG. 2 is a vertical sectional view of the tower and shows two adjacent trays and the tray and cap assemblies associated therewith.

Referring now to the drawings in greater detail and initially to FIGS. 1 and 2, a gaseous and liquid contact apparatus is shown in the form of a vertically mounted cylindrical tower 10 which is equipped with a series of vertically and uniformly spaced horizontally arranged trays 11. There are no downcomers. Each tray is provided with elongated slots 12. The slots in each tray are parallel, and the directions of elongation of the slots in adjacent trays deviate from each other angularly, for instance, at a 90° angle (see FIG. 2). Each slot is covered by an elongated cap 13 which acts as a valve and has two lengthwise extending side portions 14. Each side portion has a lengthwise extending edge 15 which is shown in FIG. 2 to be almost in contact with the top surface of the respective tray, and uniformly spaced recesses 16 that are formed by downwardly bent parts 17 of the respective side portion. The recesses are open at the respective edge.

The parts or depending members 17 extend downwardly through the respective slot 12 and have fixed thereto, for instance, by welding, abutment means 18 in the form of small angle-shaped elements, which are spaced from the underside of the respective tray 11 and serve to limit the upward movement of the cap when it is lifted by the ascending gaseous phase.

Figure 8:
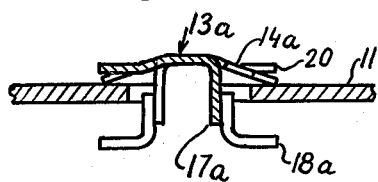
FIG. 8 is a vertical, transverse section of the assembly of FIG. 7.
Figure 10:
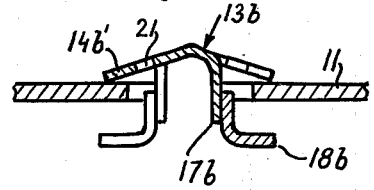
FIG. 10 is a vertical, transverse section of the assembly of FIG. 9.
Figure 11:
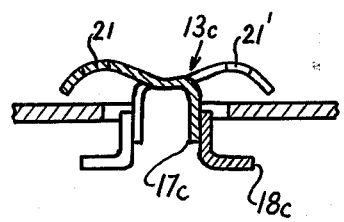
FIG. 11 is a vertical, transverse sectional view of one more modification of the tray and cap assembly.

The top of the caps 13 is shown to have an arcuate, and more specifically a convex, profile when viewed downwardly. Any hollowly shaped profile, with the hollow being downwardly directed so that the cap covers its slot 13, strengthens the cap and makes any other strengthening means unnecessary. Such strengthening permits the use of a length and width ratio of the top of between about 10 to 1 and 30 to 1. The cap top may also be shaped, for instance, as shown in FIGS. 8, 10 and 11. The hollow profile is important not only because of the rigidity obtained therethrough but also because it affords the caps or valves greater stability in their floating positions and better distribution of the gas stream rising from below.

From FIG. 1 it will be seen that the recesses 16 along one of the edges 15 of the cap 13 are staggered with respect to the recesses 16 along the other edge 15 of the same cap.

When viewed in a direction transversely of the elongation of the parallel slots 12 and caps 13, FIG. 1 shows further that the left-hand and right-hand recesses, respectively, of all the caps are transversely aligned. It is also seen that recesses in the caps and unaltered edge portions of side portions alternate with each other along transverse lines. These features make the formation of oppositely flowing streams of liquid possible, as is indicated by arrows in FIG. 1. Gas and/or vapor ascending from beneath an unaltered edge portion of a side portion of a cap causes liquid to accumulate on the tray and to flow toward the nearest aligned recess to descend therethrough.

Figure 3:
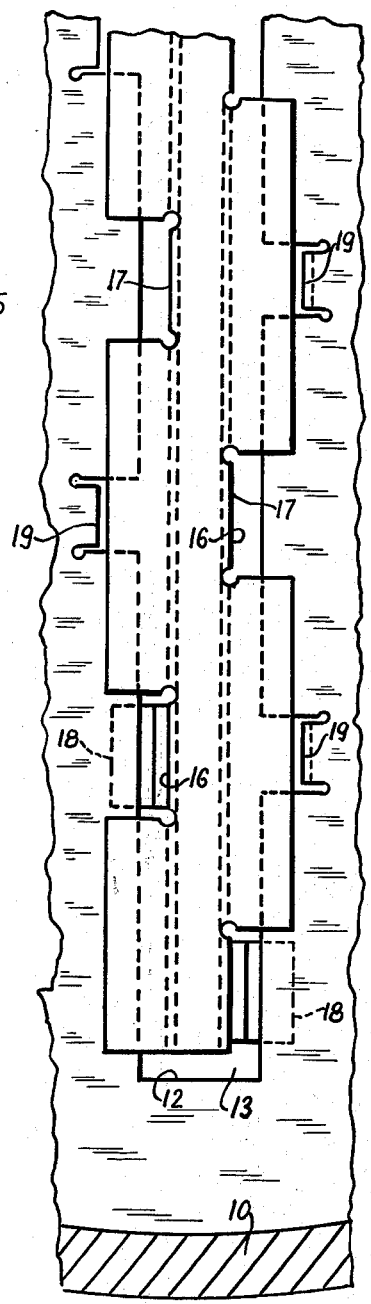
FIG. 3 is a fragmentary plan view of a modified tray and cap assembly.
Figure 4:
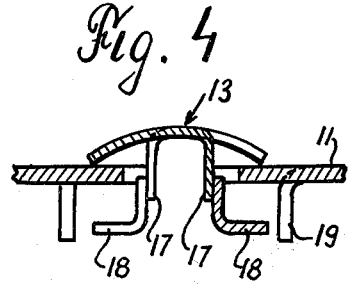
FIG. 4 is a vertical transverse section, on an enlarged scale, of the tray and cap assembly of FIG. 3.
Figure 5:
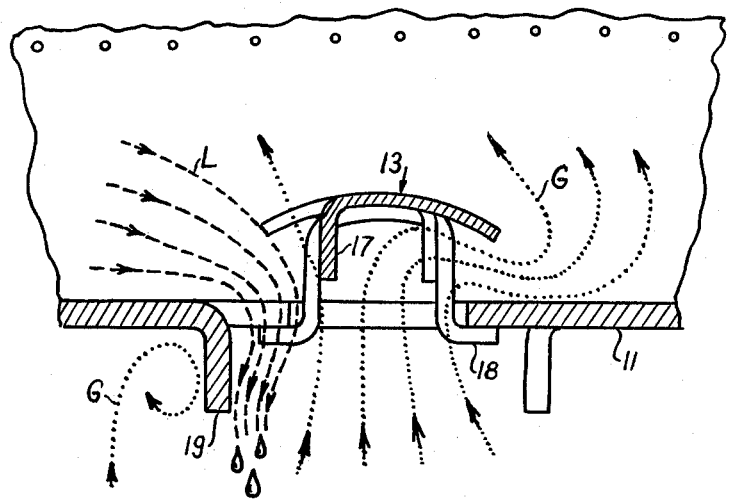
FIG. 5 is a section similar to that of FIG. 4, still more enlarged, showing the cap in its lifted and fully open position.

FIGS. 3, 4 and 5 show that the edge portions of the tray, which define the slots 13, have tongues 19 which are also displaced downwardly and form additional recesses. The tongues and additional recesses along one longitudinal edge (tray edge) of a slot are, according to FIG. 3, staggered with respect to the tongues 9 and additional recesses along the other longitudinal slot edge. The construction shown in FIG. 3 ensures highly favorable conditions for the creation of transversely directed streams of descending liquid.

From FIG. 3 it is seen that the construction shown therein involves, in addition to the staggered relationship of both the depending members 17 and the tongues 19, still another relationship concerning the depending members 17 and tongues 19, namely, that a member 17 on one side of the cap is aligned with a tongue 19 near the opposite side of the same cap. It should be borne in mind that the tongues are formed in slot-defining edge portions of the tray, not in the side portions of the cap.

Turning to FIG. 5 which shows a valve or cap 13 in fully open position and is also explanatory of a more or less open valve position, it is seen that both the members 17 depending from the side portions, and the tongues 19 depending from the edge portions of the slot 12, create passages in addition to the slots in the trays. The additional passages formed by the depending members 17 and the tongues 19 serve to discharge liquid from the mass of liquid accumulated on the tray to be guided downwardly, undisturbed from rising vapors and/or gases (see the left-hand side of FIG. 5). The recesses formed by the depending members 17 and the tongues 19 complement each other and provide sufficient area for the liquid flow in downward direction. The dashed line arrows L indicate the flow of liquid whereas the dotted line arrows G indicate the flow of the gaseous or vaporous phase.

Figure 6:
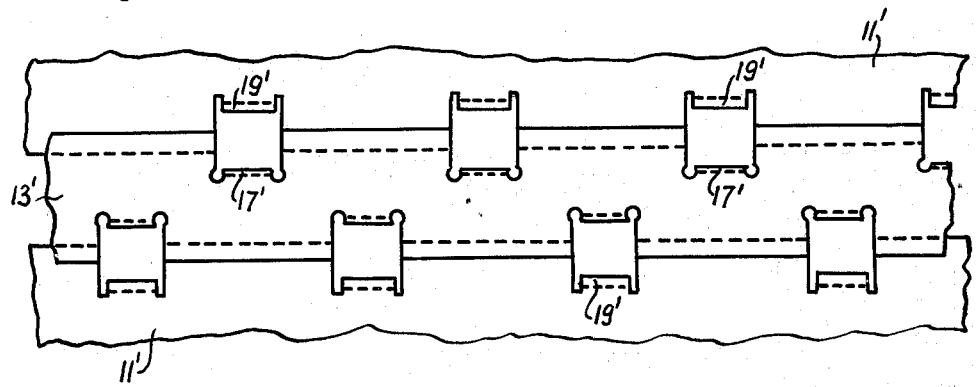
FIG. 6 is a fragmentary plan view of another modification of the tray and cap assembly.

Having reference to FIG. 6, the construction shown therein provides that a depending member 17' on one side of the cap 13' and a tongue 19' along a slot edge on the same side overlap each other. The construction of FIG. 6 will be best understood when it is compared with the construction of FIG. 3. While according to FIG. 3 each member 17 is aligned with a tongue 19, in the tray and cap assembly according to FIG. 6 each member 17' substantially coincides with a tongue 19'. The members 17' and tongues 19' are formed like the member 17 and tongue 19, respectively, but are differently designated because of their different locations.

Figure 7:
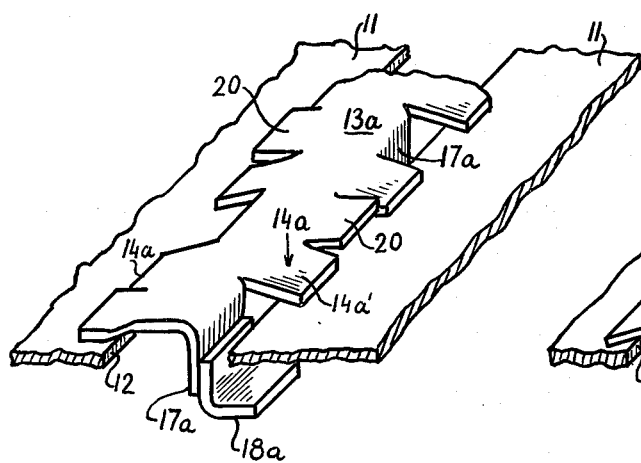
FIG. 7 is a fragmentary perspective view of a further modification of the tray and cap assembly.

Referring to the modification shown in FIGS. 7 and 8, there is shown a slot 12 in a tray 11. The slot is covered by a cap 13a whose side portions are provided with depending members 17a having abutments 18a secured thereto. The cap has, in addition to the downwardly extending depending members 17a, upwardly bent cutouts 20. The depending members on one side of the cap 13a are staggered with respect to the depending members on the other cap side. The cutouts 20 are slightly bent in an upward direction and form permanent passages for the escape of vapors and/or gases. Such passages are passable at a time before the vapor and/or gas pressure is capable of starting to act on the cap and to lift same. The depending members 17a and the cutouts 20 are shown to have between them full edge portions 14a' of the side portions 14a of the cap. Thus, there is a sequence of consecutive series, each comprising a depending member 17a, an edge portion 14a', and a cutout 20. From FIG. 8 it is seen that the profile of the cap 13a differs from that of the cap 13 shown in FIGS. 2, 4 and 5, but it is again shaped to be hollow and to have its hollow directed downwardly. The side portions 14a contact the upper surface of the tray 11.

Figure 9:
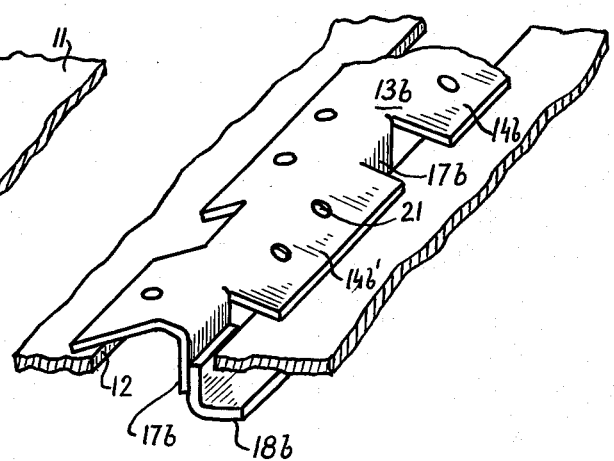
FIG. 9 is a fragmentary perspective view of still another modification of the tray and cap assembly.

FIGs. 9 and 10 are views similar to that of FIG. 7 and 8, respectively. The cap 13b is provided with depending members 17b. There are no cutouts 20 like those shown in FIGS. 7 and 8. The full edge portions 14b' of the side portions 14b of the cap 13b, which lie between the depending members 17b are longer than the corresponding parts 14a' in FIG. 7. Still another modification is that the top of the cap is apertured, the apertures being designated 21. These apertures act like the passages formed by the cutouts 20 in FIG. 7, constituting permanent passages for the rising gaseous phase. The top of the cap is of rooflike shape. The side portions of the top meet an obtuse angle.

FIG. 11 shows a top of a cap, which has a convexo-concave-convexo shape when viewed in cross section, apertures 21' being provided in the top.

ADVANTAGES

It is believed that the fluid contact tray of our invention and the construction and operation of preferred forms of the tray for practicing the invention as well as the many advantages of the invention will be fully understood from the foregoing detailed description. Some of these advantages are reviewed hereinafter.

The caps of the invention are constructed and arranged so as to operate as highly stabilized float valves with minimum sensitivity to varying operating conditions and maximum resistance to undesirable oscillations and pressure fluctuations. Essentially, this is accomplished by elongated slots of much greater length than width, covered by elongated caps. It has been proven that the moment of inertia to the transverse axis of the caps increases with the increase in length of the caps.

The ratio between length and width of the cap tops is according to the invention about 10 to 1 and 30 to 1. With known constructions using a similar ratio, transversely extending elements were used which connected the caps or valves with each other and greatly restricted the free movement of the valves. We succeeded in doing away with such strengthening but the freedom of the valve movement restricting elements by providing such shapes for the top of each cap as will ensure sufficient rigidity without any added reinforcing means. The top of a cap, according to the invention, is generally either of an arcuate or angular shape, when viewed in cross section. More broadly, at least a portion of the top of our cap has an outwardly directed profile.

Our tray ensures even distribution of the countercurrently moving two phases, intimate mixing of the two phases, and a wide flexibility of the tower within a broad range of uses. The kinetic energy of the ascending vapors and/or gases is absorbed by the liquid mass and since, in addition, the tray of the invention is free of any obstacles to the liquid flow no sedimentation of foreign matter takes place.

Interference between the phases in proximity of the valves is undersirable. Constructions as shown in FIGS. 1, 3 and 6 promote the flow of liquid in streams undisturbed by the gaseous streams from below. The depending members 17, for instance, of FIGS. 1 to 5 as well as the likewise downwardly directed tongues 19, for instance, of FIGS. 3 to 5 help separate the flow of the liquid and that the gaseous phase. Under normal operating conditions, vapors and/or gases coming from below the caps are uniformly distributed above the liquid on the trays and form a high density foam which ensures intimate contact of both phases. The required intimate contact between the phases occurs mainly in the layer of foam. There is also contact between the phases in the spaces underneath the trays.

The present tray is of small height, which increases the free operating spaces between the trays and reduces substantially the carrying along of liquid drops by the gaseous phase.

We claim:

1. A bubble tray and cap assembly for fluid contact apparatus for effecting intimate contact between a rising gaseous and/or vaporous phase and a descending liquid phase, comprising
   A. a tray member having a plurality of elongated slots arranged in axially parallel spaced relationship adjacent each other
   B. a plurality of elongated caps covering said slots, and mounted therein to be reciprocally movable transverse to the plane of said tray,
      a. each cap having opposite lengthwise extending said portions above the upper surface of said tray member,
         1. each of said portions having alternating parts downwardly bent forming a row of longitudinally spaced recesses, the recesses along one of said side portions being staggered with respect to the recesses along the edge of the other side portion, said recesses forming passages for said heavier descending liquid phase, said downwardly bent part constituting longitudinally spaced individual depending members spaced from the edge of said slots to deflect said liquid phase downwardly.
         2. each of said depending members having a first portion extending downwardly through the respective slot and in a plane parallel to the longitudinal axis of the slot,
         3. abutment means secured to said depending members and spaced from the underside of said tray member so as to engage said underside and limit the upward movement of the respective cap when lifted by said rising phase, and
      b. said caps being arranged within said slots so that the lengthwise extending edges along one side of one of said caps and the downwardly bent parts along the opposite side of the next adjacent one of said caps lie along common lines transverse to the elongated axis of said slots to cause flow of said liquid phase from the one extending edge into the recess of the next adjacent cap and downwardly in the passage defined by said depending respective member.

2. The assembly according to claim 1 wherein said side portions are cut to provide cutouts between the alternating parts of said side portions, said cutouts being slightly bent in an upward direction and providing permanent passages for said rising phase.

3. The assembly according to claim 2 wherein each of said recesses formed in said cap is aligned in opposition to a recess in said tray.

4. In the assembly according to claim 2, wherein each of said recesses formed in said cap is located between adjacent ones of said tray recesses.

5. A bubble tray and cap assembly for fluid contact apparatus for effecting intimate contact between a rising gaseous and/or vapourous phase and a descending liquid phase, comprising A. a tray member having a plurality of elongated slots arranged in axially parallel spaced relationship adjacent each other, and each of said slots being defined by edge portions of said tray member and each of said edge portions has a lengthwise extending tray edge and a row of longitudinally spaced recesses opening into said tray edge, the tray recesses along one tray edge being staggered with respect to the tray recesses along the other tray edge, said tray recesses forming additional passages for said heavier descending phase and being formed by downwardly displaced tongues of said edge portions, B. an elongated cap mounted in each of said slots and reciprocally movable transverse to the plane of the tray, a. each cap having opposite lengthwise extending said portions above the upper surface of said tray member, 1. each of said side portions having alternating parts downwardly bent forming a row of longitudinally spaced recesses, the recesses along one of said side portions being staggered with respect to the recesses along the edge of the other side portion, said recesses forming passages for said heavier descending liquid phase, said downwardly bent part constituting longitudinally spaced individual depending members spaced from the edge of said slots to deflect said liquid phase downwardly, 2. abutment means secured to said depending members and spaced from the underside of said tray member so as to engage said underside and limit the upward movement of the respective cap when lifted by said rising phase, and b. said caps being arranged within said slots so that the lengthwise extending edges along one side of one of said caps and the downwardly bent parts along the opposite side of the next adjacent one of said caps lie along common lines transverse to the elongated axis of said slots to cause flow of said liquid phase from the one extending edge into the recess of the next adjacent cap and downwardly in the passage defined by said respective depending member.

* * * * *